3,329,717
TRICYCLIC CARBOXAMIDES
John Krapcho, Somerset, N.J., assignor, by mesne assignments, to E. R. Squibb & Sons, Inc., New York, N.Y., a corporation of Delaware
No Drawing. Filed Jan. 17, 1964, Ser. No. 338,310
9 Claims. (Cl. 260—559)

This invention relates to derivatives of tricyclic compounds of the fluorene type. More particularly, the invention relates to new compounds of the formula (I)
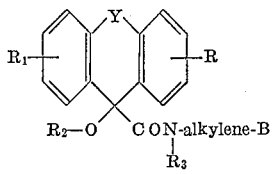

and to acid addition and quaternary ammonium salts of these compounds.

Y in Formula I represents $(CH_2)_n$, wherein $n$ is 0 to 3, and CH=CH.

R and $R_1$, which may be the same or different in a given compound, each represents hydrogen, halogen, trihalomethyl, lower alkyl, lower alkoxy, nitro, amino and di-lower alkylamino.

$R_2$ represents lower alkyl, lower alkenyl, lower alkynyl, R-phenyl-lower alkylene, R-phenyl-lower alkenylene and cycloalkyl-lower alkyl. $R_3$ represents the same groups as $R_2$ and hydrogen in addition.

B is a basic nitrogen-containing radical of less than 12 atoms, which may alternatively be described as including the following radicals:

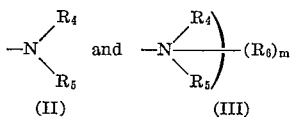

(II)          (III)

$R_4$ and $R_5$ each represents hydrogen, lower alkyl, hydroxy-lower alkyl, lower alkenyl, lower alkynyl, cycloalkyl (lower alkyl), R-phenyl, R-phenyl(lower alkyl), R-phenyl(lower alkenyl), R-benzoyl(lower alkyl), R-phenoxy(lower alkyl), pyridyl and pyridyl(lower alkyl).

$R_4$ and $R_5$ may also be joined and, together with the nitrogen atom to which they are attached, form a 5- to 7-membered heterocyclic containing oxygen, sulfur or another nitrogen atom as in III. In this case $R_4$ and $R_5$ together represent tetramethylene, pentamethylene, hexamethylene, oxatetramethylene, oxapentamethylene, azatetramethylene, azapentamethylene, azahexamethylene, thiatetramethylene and thiapentamethylene. In addition, the heterocyclic may bear one or two of the groups halogen, trihalomethyl, lower alkyl, lower alkoxy, hydroxy, lower alkanoyl, hydroxy-lower alkyl, R-phenyl, R-phenyl-lower alkyl, pyridyl, pyridyl-lower alkyl and lower alkanoyloxy-lower alkyl. $R_6$ in Formula III, represents these substituents and hydrogen, $m$ being 1 or 2.

The term "alkylene" in Formula I refers to straight or branched chain saturated aliphatic chains having up to about 15 carbon atoms. Lower alkylene groups, however, are preferred.

The lower alkyl groups represented by the symbols include straight or branched chain alkyl groups of the character of methyl, ethyl, propyl, isopropyl, butyl, isobutyl, t-butyl, amyl, etc. Similar groups are attached to an oxygen atom in the lower alkoxy groups. The lower alkenyl and lower alkynyl groups are similar hydrocarbon groups having one double or one triple bond, respectively, including for example, allyl, butenyl, methallyl, propargyl and the like. Lower alkenylene similarly refers to straight or branched chain monounsaturated hydrocarbon radicals.

The phenyl-lower alkylene and phenyl-lower alkenylene groups include, respectively, benzyl, phenethyl, cinnamyl and the like.

Each of the four halogens is contemplated by the terms "halo" or "halogen" and "trihalomethyl," but in the case of the halogens themselves chlorine and bromine are preferred whereas trifluoromethyl is the preferred trihalomethyl group.

The lower alkanoyl groups are the acyl moieties derived from lower fatty acids containing groups of the type described above and include, for example, acetyl, propionyl, butyryl and the like.

The cycloalkyl groups are preferably 3 to 7 carbon atom alicyclics including cyclopropyl, cyclobutyl, cyclopentyl, cyclohexyl and cycloheptyl.

Illustrative of the nitrogen groups II are the following: amino, lower alkylamino, e.g., methylamino, ethylamino, di(lower alkyl)amino, e.g., dimethylamino, diethylamino, dipropylamino, (hydroxy-lower alkyl)amino, e.g., hydroxyethylamino, ω-di(hydroxy-lower alkyl)amino, e.g., di(hydroxyethyl)amino, phenyl(lower alkyl) amino, e.g., benzylamino, phenethylamino, N-(lower alkyl)-phenyl-(lower alkyl)-amino, e.g., N-methylbenzylamino and the like.

Illustrative of the heterocyclics III are the following: piperidino, (lower alkyl)piperidino, e.g., 2-methylpiperidino, di(lower alkyl)piperidino, e.g., 2,6-dimethylpiperidino, (lower alkoxy)piperidino, e.g., 4-methoxypiperidino, 2-, 3- or 4-piperidyl, 2-, 3- or 4-(N-lower alkylpiperidyl), 2-, 3- or 4-(N-methylpiperidyl), pyrrolidino, (lower alkyl)pyrrolidino, e.g., 3-methylpyrrolidino, di(lower alkyl)pyrrolidino, e.g., 2,5-dimethylpyrrolidino, (lower alkoxy)pyrrolidino, e.g., 4-ethoxypyrrolidino, 2- or 3-pyrrolidyl, 2- or 3-(N-lower alkyl pyrrolidyl), e.g., 2- or 3-(N-methylpyrrolidyl)morpholino, (lower alkyl)morpholino, e.g., 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., 3-methylthiamorpholino, di(lower alkyl)thiamorpholino, e.g., 2,3-dimethylthiamorpholino, (lower alkoxy)thiamorpholino, e.g., 2-methoxythiamorpholino, piperazino, (lower alkyl)piperazino, e.g., $N^4$-methylpiperazino, 2-methylpiperazino or 3-methylpiperazino, di(lower alkyl)piperazino, e.g., 2,3-dimethylpiperazino, 4-(R-phenyl)piperazino, 4-(R-phenyl)lower allylpiperazino, 4-(R-phenyl)lower alkylpiperazino, 4-(4-pyridyl)piperazino, hexamethyleneimino, and homopiperazino.

The preferred members of the class defined by Formula I are those wherein $n$ is 0 (i.e., a fluorene ring system), R and $R_1$ are both either hydrogen or chlorine, $R_2$ is lower alkyl, especially ethyl, $R_3$ is hydrogen or lower alkyl, especially methyl, the alkylene chain has 2 or 3 carbon atoms and B is di-lower alkylamino, especially dimethylamino.

The compounds of Formula I are produced by converting a hydroxy acid of the formula

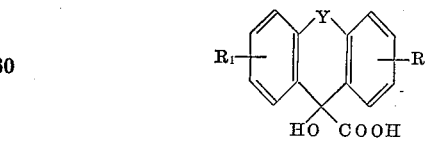

to the halo-carbonyl halide V, preferably the chloride, e.g., with phosphorus pentachloride or phosphorus pentabromide, (V)
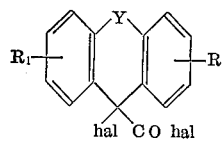

Compound V reacts with the diamine (VI) 

to produce (VII) 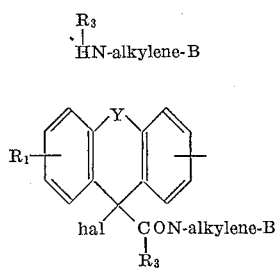

Prolonged heating of VII with an alcohol $R_2$—OH yields the product I.

The hydroxy acids IV are readily prepared from the known ketones (VIII) 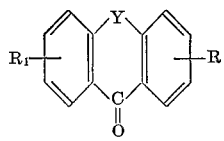

by reaction first with sodium or potassium amide and then with carbon dioxide.

The symbols in Formulas IV to VIII have the same meaning as previously defined and "hal" refers to halogen.

The bases of Formula I form acid addition salts by reaction with the common inorganic and organic acids. Such inorganic salts as the hydrohalides, e.g., hydrobromide, hydrochlorides, hydroiodide, etc., sulfates, nitrates, phosphates, borates, etc., and organic salts as acetate, oxalate, tartrate, maleate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like, are all within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl(lower alkyl)halides and sulfates such as benzyl bromide, benzyl sulfate, etc. This is accomplished by reacting the base with the alkyl halide, sulfate, or the like.

The novel compounds of Formula I are useful as analgesics. They may be administered orally in the form of tablets, capsules, elixirs and the like, or parenterally in injectable form by incorporating the appropriate dosage (e.g. within the range of about 1 to about 100 mg.) of the base of Formula I or a physiologically acceptable acid addition salt or quaternary ammonium salt thereof in a conventional vehicle, including diluent, excipient, binder, flavor and the like if necessary, according to accepted pharmaceutical practice.

The following examples are illustrative of the invention. All temperatures are expressed on the centigrade scale.

*Example 1.—N-(2-dimethylaminoethyl)-9-ethoxy-N-methylfluorene-9-carboxamide hydrochloride*

(A) *Preparation of 9-chlorofluorene-9-carbonyl chloride.*—A slurry of 50.0 g. of 9-hydroxyfluorene-9-carboxylic acid in 150 ml. of carbon tetrachloride is treated portionwise with 104 g. of phosphorus pentachloride. The mixture is refluxed for thirty minutes and then concentrated at reduced pressure. The residue is cooled, dissolved in 800 ml. of benzene and the solution poured onto ice-water. The organic phase is separated, dried over magnesium sulfate, filtered and concentrated at reduced pressure. The residue is dissolved in 500 ml. of hot hexane and cooled to give 33.7 g. of solid product, M.P. 105–110°. The material is distilled at 138–140° (0.8 mm.) and then melts at 111–113°.

(B) *Preparation of N-(2-dimethylaminoethyl)-9-ethoxy-N-methylfluorene-9-carboxamide hydrochloride.*—A solution of 7.0 g. of the acid chloride from part (A) in 100 ml. of benzene is cooled to 15° and treated dropwise with a solution of 2.7 g. of N,N,N'-trimethylethylenediamine in 25 ml. of benzene. A heavy precipitate separates from the mixture. After standing at room temperature overnight, the slurry is refluxed for 15 minutes and then treated dropwise with 100 ml. of absolute alcohol while 150 ml. of solvent is distilled. The residue is treated with 100 ml. of absolute alcohol and the solution is refluxed for 14 hours. The bulk of the solvent is evaporated; the residue is cooled, treated with 40 ml. of water. The product is extracted with 100 ml. portions of ether (3 times) and dried over magnesium sulfate. After evaporation of the solvent, the residue is distilled to give 5.0 g. of yellow-brown syrupy material, B.P. 195–200° (0.5 mm.). This material is dissolved in 300 ml. of ether, filtered from the small amount of insoluble material and the pale yellow filtrate containing the free base is treated with one equivalent of hydrogen chloride in 50 ml. of ether to give a heavy colorless precipitate weighing 4.6 g.; 175–180°. This material is digested in 125 ml. of butanone and filtered from the small quantity of insoluble material. After cooling the filtrate yields 3.3 g. of colorless crystalline product, M.P. 180–182°.

*Example 2.—9-ethoxy-N-methyl-N-[2-(methylphenethylamino)ethyl]fluorene-9-carboxamide tartrate*

Interaction of 18.5 g. of 9-chlorofluorene-9-carbonyl chloride with 13.5 g. of N,N'-dimethyl-N-phenethylethylenediamine in benzene, followed by treatment with 1 l. of ethanol in the manner described in Example 1, part (B), gives the base as a syrupy liquid boiling at 240–250° (0.2 mm.). A solution of 7.0 g. of base in 7 ml. of ethanol is treated with a solution of 2.6 g. of tartaric acid in 7 ml. of ethanol. Dilution to 200 ml. of ether yields a gummy product. Trituration of the latter with ether provides a granular solid.

By using methyl iodide in place of the tartaric acid above, the quaternary salt, 9-ethoxy-N-methyl-ω-[2-methylphenethylamino)ethyl]fluorene - 9 - carboxamide methiodide is obtained.

*Example 3.—N-(2 - piperidinoethyl)-9-ethoxy-N-methylfluorene-9-carboxamide hydrochloride*

Following the procedure in Example 1, but substituting an equivalent amount of 2-piperidinoethyl-N-methylamine for the N,N,N'-trimethylethylenediamine in step (b), the product is obtained.

*Example 4.—N(2 - morpholinoethyl)-9-ethoxy-N-methylfluorene-9-carboxamide hydrochloride*

Following the procedure in Example 1, but substituting an equivalent amount of 2-morpholinoethyl-N-methylamine for the N,N,N'-trimethylethylenediamine in step (b), the product is obtained.

*Example 5.—N[2-(4-methyl - 1 - piperazinyl)ethyl]-9-ethoxy-N-methylfluorene-9-carboxamide hydrochloride*

Following the procedure in Example 1, but substituting an equivalent amount of N[2-(4-methyl-1-piperazinyl)ethyl]-N-methylamine for the N,N,N'-trimethylethylenediamine in step (b), the product is obtained.

*Example 6.—N-[2-(4-cinnamyl - 1 - piperazinyl)ethyl]-9-ethoxy-N-methylfluorene-9-carboxamide hydrochloride*

Following the procedure in Example 1, but substituting an equivalent amount of 2-(4-cinnamyl-1-piperazinyl)ethyl - N - methylamine for N,N,N'-trimethylethylenediamine in step (b), the product is obtained.

Example 7.—N-allyl-N-(2-dimethylaminoethyl)-9-ethoxyfluorene-9-carboxamide hydrochloride Following the procedure in Example 1, but substituting an equivalent quantity of N-allyl-N',N'-dimethylethylenediamine for N,N,N'-trimethylethylenediamine in step (b), the product is obtained.

Example 8.—N-cyclopropylmethyl-N-(2-dimethylaminoethyl)-9-ethoxyfluorene-9-carboxamide hydrochloride Following the procedure in Example 1, but substituting an equivalent quantity of N-cyclopropylmethyl-N',N'-dimethylethylenediamine for N,N,N'-trimethylethylenediamine in step (b), the product is obtained.

Example 9.—9-allyloxy - N - (2-dimethylaminoethyl)-N-methylfluorene-9-carboxamide hydrochloride Following the procedure in Example 1, but substituting an equivalent amount of allyl alcohol for the absolute alcohol in part (b), the product is obtained.

Example 10.—N-(2-dimethylaminoethyl) - N - methyl-9-propargyloxyfluorene-9-carboxamide hydrochloride Following the procedure in Example 1, but substituting an equivalent quantity of propargyl alcohol for the absolute alcohol in part (b), the product is obtained.

Example 11.—9-cyclopropylmethoxy - N - (2 - dimethylaminoethyl) - N-methyl-fluorene-9-carboxamide hydrochloride Following the procedure of Example 1, but substituting cyclopropylmethanol for the absolute alcohol in part (b), the product is obtained.

Example 12.—N-(2-dimethylaminoethyl) - 5 - ethoxy-N-methyldibenzo[a,d]cyclooctadiene - 5 - carboxamide hydrochloride (A) *Preparation of 5-hydroxydibenzo[a,d]cyclooctadiene-5-carboxylic acid.*—A solution of 22.2 g. of dibenzo[a,d]cyclooctadiene-5-one [J. Med. Chem., 6, 132 (1963)] in 100 ml. of ether is added to a solution of 10 g. of potassium in 400 ml. of liquid ammonia. After the ammonia evaporated, the residue is dissolved in 400 ml. of ether and the mixture treated with finely divided Dry Ice. The mixture is poured onto 100 ml. of cold water and acidified with dilute hydrochloric acid. The layers are separated and the aqueous phase extracted with ether. The ether phases are combined, dried over magnesium sulfate, filtered and the solvent evaporated to give the product as a residue.

(B) *Preparation of 5-chlorodibenzo[a,d]cyclooctadiene-5-carbonyl chloride.*—The hydroxy acid from part (a) is treated with an equivalent quantity of phosphorus pentachloride as in Example 1, part (b), to give 5-chlorodibenzo[a,d]cyclooctadiene-5-carbonyl chloride.

(C) *Preparation of N - (2 - dimethylaminoethyl)-5-ethoxy-N-methyldibenzo[a,d]cyclooctadiene - 5 - carboxamide hydrochloride.*—By substituting the equivalent quantity of the material from part (b) for the 9-chlorofluorene-9-carbonyl chloride in Example 1, part (b), the product is obtained.

Example 13.—N-(2-dimethylaminoethyl) - 5 - ethoxy-N-methyldibenzo[a,d]cycloheptadiene - 5 - carboxamide hydrochloride Following the procedure in Example 1, but substituting an equivalent quantity of 5-chlorodibenzo[a,d]cycloheptadiene-5-carbonyl chloride [J. Med. Chem. 6, 515 (1963)] for the 9-chlorofluorene-9-carbonyl chloride in step (b), the product is obtained.

Example 14.—N-(2-dimethylaminoethyl) - 3 - chloro-5-ethoxy-N-methyldibenzo[a,d]cycloheptadiene - 5 - carboxamide hydrochloride Following the procedure of Example 12, but substituting an equivalent quantity of 3-chlorodibenzo[a,d]cycloheptadiene-5-one for the dibenzo[a,d]cyclooctadiene-5-one of part (a), the product is obtained.

Example 15.—N-(2-dimethylaminoethyl) - 5 - ethoxy-N-methyl anthracene-9-carboxamide hydrochloride Following the procedure of Example 12, but substituting an equivalent quantity of anthrone for the dibenzo[a,d]cyclooctadiene-5-one, the product is obtained.

Example 16.—N-(2-dimethylaminoethyl) - 9 - ethoxy-2-methoxy-N-methylfluorene-9-carboxamide hydrochloride Following the procedure of Example 12, but substituting an equivalent quantity of 2-methoxy-9-fluorenone for the dibenzo[a,d]cyclooctadiene-5-one in part (a), the product is obtained.

Example 17.—N-(2-dimethylaminoethyl) - 5 - ethoxy-N-methyldibenzo[a,e]cycloheptatriene-5-carboxamide hydrochloride Following the procedure of Example 12, but substituting an equivalent quantity of dibenzo[a,e]cycloheptatriene-5-one for the dibenzo[a,d]cyclooctadiene-5-one in part (a), the product is obtained.

Example 18.—N-(2-dimethylaminoethyl) - 5 - ethoxy-N-methyl - 3-nitrodibenzo[a,e]cycloheptatriene-5-carboxamide hydrochloride Following the procedure of Example 12, but substituting an equivalent of 3-nitrodibenzo[a,e]cycloheptatriene-5-one for the dibenzo[a,d]cyclooctadiene-5-one in part (a), the product is obtained.

By following the procedure of Example 1, but by combining any of the amines of Examples 1 to 11 with the ring systems used in Examples 12 to 18, other compounds of Formula I are obtained.

What is claimed is:

1. A compound selected from the group consisting of bases of the formula

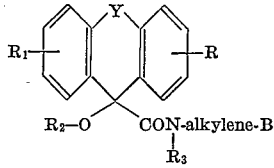

wherein Y is a member of the group consisting of $(CH_2)_n$ and $CH=CH$, $n$ is an integer from 0 to 3, R and $R_1$ each is a member of the group consisting of hydrogen, halogen, trihalomethyl, lower alkyl, lower alkoxy, nitro, amino and dilower alkylamino, $R_2$ is a member of the group consisting of lower alkyl, lower alkenyl, lower alkynyl, R-phenyl-lower alkylene, R-phenyl-lower alkenylene and cycloalkyl-lower alkyl wherein the cycloalkyl group contains three to seven carbon atoms, $R_3$ is a member of the group consisting of hydrogen, lower alkyl, lower alkenyl, lower alkynyl, R-phenyl-lower alkylene, R-phenyl-lower alkenylene and cycloalkyl-lower alkyl wherein the cycloalkyl group contains three to seven carbon atoms, and B is a basic nitrogen containing radical of less than 12 atoms selected from the group consisting of

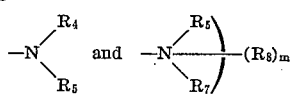

wherein $R_4$ and $R_5$ are selected from the group consisting of hydrogen, lower alkyl, hydroxyloweralkyl, lower alkenyl, lower alkynyl, cycloalkyl(lower alkyl), R-phenyl, R-phenyl(lower alkyl), R-phenyl(lower alkenyl), R-benzoyl(lower alkyl), R-phenoxy(lower alkyl), pyridyl and pyridyl(lower alkyl); $R_6$ and $R_7$ together are selected from the group consisting of tetramethylene, pentamethylene, hexamethylene, oxatetramethylene, oxapentamethylene, azatetramethylene, azapentamethylene, azahexamethylene, thiatetramethylene and thiapentamethylene; $R_8$ is selected from the group consisting of halogen, trihalomethyl, lower alkyl, hydroxy, lower alkanoyl, hydroxylower-alkyl, R-phenyl, R-phenyl-lower alkyl, pyridyl, pyridyl-lower alkyl and lower alkanoyloxy-lower alkyl; and $m$ is one or two,
and acid addition and quaternary ammonium salts of said bases.

2. A compound of the formula

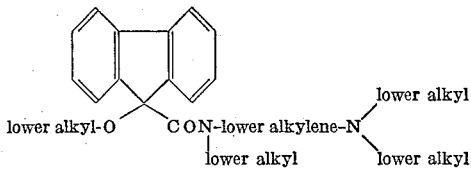

3. Physiologically acceptable acid addition salts of a compound of claim 2.

4. A compound of the formula

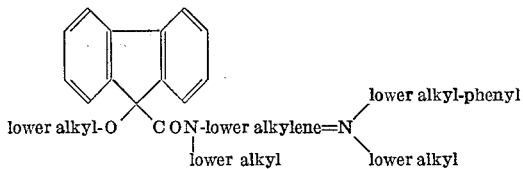

5. N-(2 - dimethylaminoethyl)-9-ethoxy-N-methylfluorene-9-carboxamide.
6. N-(2 - dimethylaminoethyl)-9-ethoxy-N-methylfluorene-9-carboxamide hydrochloride.
7. 9 - ethoxy-N-methyl-N-[2-(methylphenethylamino)ethyl] fluorine-9-carboxamide.
8. N-(2-dimethylaminoethyl)-5-ethoxy-N-methyldibenzo[a,d]cycloheptadiene-5-carboxamide.
9. N-(2-dimethylaminoethyl)-5-ethoxy-N-methyldibenzo[a,e]cycloheptatriene-5-carboxamide.

References Cited
UNITED STATES PATENTS 2,994,700   8/1961   Krapcho _____ 260—559

OTHER REFERENCES

Chemical Abstracts, vol. 59, Subject Index (A–I), page 990S (column 3) (1963).

Dictionary of Organic Compounds, 4th Ed., vol. 3, Din-Iza, pages 1279 and 1440, New York, Oxford, 1965.

Petyunin et al.: Chemical Abstracts, vol. 59, column 7526 (Sept. 2, 1963).

Petyunin et al.: Zhurnal Obshchei Khimii, vol. 33, pages 755 to 761 (March 1963).

JOHN D. RANDOLPH, *Primary Examiner.*

WALTER A. MODANCE, *Examiner.*

NATALIE TROUSOF, *Assistant Examiner.*